United States Patent
Mason

(10) Patent No.: US 11,089,019 B2
(45) Date of Patent: Aug. 10, 2021

(54) TECHNIQUES AND ARCHITECTURES FOR SECURE SESSION USAGE AND LOGGING

(71) Applicant: salesforce.com, inc., San Francisco, CA (US)

(72) Inventor: Paul Anthony Mason, Port Talbot (GB)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/365,393

(22) Filed: Nov. 30, 2016

(65) Prior Publication Data

US 2018/0152451 A1    May 31, 2018

(51) Int. Cl.
*H04L 29/06*    (2006.01)

(52) U.S. Cl.
CPC .......... *H04L 63/10* (2013.01); *H04L 63/1425* (2013.01); *H04L 63/1466* (2013.01)

(58) Field of Classification Search
CPC ........ G06F 21/10; G06F 21/128; G06F 21/44; H04L 63/10; H04L 63/0876; H04L 63/1466; H04L 9/0894; H04L 9/238; H04L 6/0892; H04L 41/5051; H04N 21/438; H04N 21/28
USPC .......................................................... 726/4
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |

(Continued)

*Primary Examiner* — Ashokkumar B Patel
*Assistant Examiner* — William B Jones
(74) *Attorney, Agent, or Firm* — Jaffery Watson Mendonsa & Hamilton LLP

(57) ABSTRACT

Techniques for session security. Information corresponding to an electronic device used to access a resource is gathered. The information uniquely identifies the electronic device. Subsequent accesses to the resource during the session are monitored to determine whether changes occur to the information. A security action is taken in response to a change in the information.

21 Claims, 5 Drawing Sheets

(56) References Cited

U.S. PATENT DOCUMENTS

| | | |
|---|---|---|
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0038996 A1* | 2/2005 | Meyerson ........... H04L 63/0227 713/165 |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2015/0381621 A1* | 12/2015 | Innes ..................... H04L 9/321 726/7 |
| 2016/0216130 A1* | 7/2016 | Abramson ......... G01C 21/3423 |
| 2017/0124301 A1* | 5/2017 | Baldwin ................. H04L 67/42 |

\* cited by examiner

TECHNIQUES AND ARCHITECTURES FOR SECURE SESSION USAGE AND LOGGING

TECHNICAL FIELD

Embodiments relate to techniques for session management. More particularly, embodiments relate to techniques for providing secure session management and logging.

BACKGROUND

Traditional techniques for secure session management commonly use cookies (HTTP cookies, web cookies, Internet cookies, browser cookies) and/or other types of data stored on the client side. In general, a cookie is data that is maintained on a computer running a browser to access a web site for consistent accesses. For example, cookies can be utilized for authentication purposes to streamline the process of accessing secure resources via a web site. However, malware can be utilized to steal a session via copying or sealing the authentication cookie. Thus, use of cookies currently does not provide a completely secure web experience.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

As discussed above, malware can be utilized to copy a cookie and/or steal a session using cookie information and the session can then be hijacked by an unauthorized user from their own computer. Cookie theft via malware is just one example of a strategy by which an unauthorized party can hijack a session. Described herein are techniques to prevent various types of unauthorized behavior.

In various embodiments, session restrictions can be applied to prevent unauthorized access as the result of stolen cookie information. In one embodiment, source Internet Protocol (IP) address locations are applied. In one embodiment this is enabled via the administrator level. In one embodiment, administrators can have direct control over session restrictions. Described herein is a security infrastructure that supports three security levels (e.g., low, medium, high); however, any number of security levels can be supported.

In various embodiments, a machine identifier (machine ID) can be utilized to make security decisions. In one embodiment, a machine ID is a unique reference to an operating environment to uniquely reference a user based on multiple attributes, for example, browser, operating system, IP address, user name. Any combination of attributes that can allow unique identification can be used.

In one embodiment, the following security levels can be supported. No security provides logging for users with session or machine ID changes (excluding mobile devices). Low security provides the feature of "No Security" in addition to email notifications for users with session IDs used on more than one IP address (excluding mobile devices) or if the machine ID changes. Medium Security provides the features of "Low Security" and "No Security" in addition to denying access from foreign IP addresses (excluding mobile devices) or if the machine ID changes. High Security provides the features of all other levels except mobile devices require approval to be allowed access. In other embodiments, different security level features can be supported.

In various embodiments, mobile devices are treated differently than non-mobile devices because IP addresses for mobile devices can change frequently. Other attributes (e.g., browser, screen resolution, operating system) can be used to determine a machine ID for a mobile device.

Figure 1:
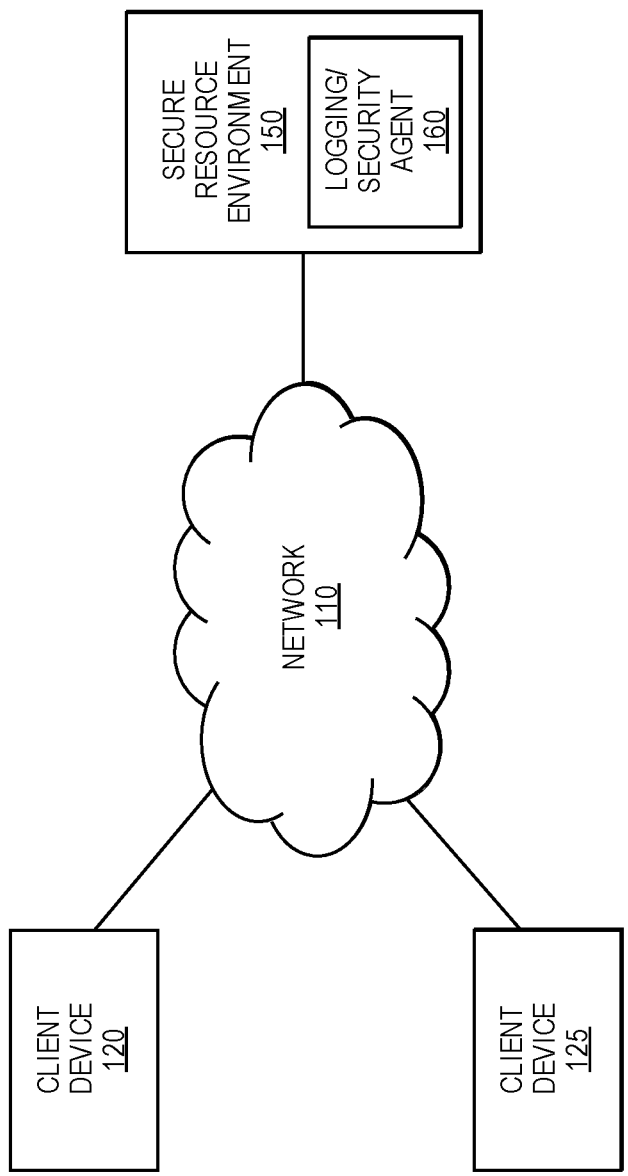
FIG. 1 is a block diagram of one embodiment of an environment in which the secure session logging and management techniques can be utilized.

FIG. 1 is a block diagram of one embodiment of an environment in which the secure session logging and management techniques can be utilized. In the example of FIG. 1, network 110 operates to connect any number of electronic devices. Network 110 can be, for example, the Internet, a local area network, a wide area network, a personal area network, or any combination thereof.

Secure resource environment 150 can be any type of environment that provides secure resources. For example, secure resource environment 150 can be an on-demand services environment, a multitenant database environment, a financial web page, a human resources database, etc. Various embodiments for on-demand services environment (including multitenancy) are described in greater detail below.

In one embodiment, secure resource environment 150 can include logging/security agent 160, which can function to provide the logging and/or security functionality described herein. In alternate embodiments, logging/security agent 160 can be external to secure resource environment 150, for example, logging/security agent 160 can function as a gateway to secure resource environment 150. In other alternate embodiments, the logging and security functionality can be provided by different entities.

Client devices 120 and 125 represent a broad range of electronic devices that can access secure resource environment 150 via network 110. Client devices 120 and 125 can be, for example, desktop computing systems, laptop computing systems, tablets, smartphones, wearable computing devices, etc. In various embodiments, mobile devices (e.g., smartphones, tablets, wearables) may be treated differently than non-mobile devices (e.g., desktops, kiosks).

In one embodiment, the logging functionality of logging/security agent 160 can operate to capture any new machines or IP addresses used per user throughout their access. In one embodiment, this is a post login feature, meaning that a user may login from new IP addresses each time, but this feature only captures when the initial IP changes throughout their login life. In one embodiment, the data captured is the username, original IP address, new IP address/addresses if applicable, original machine ID, new machine ID, time(s) of change.

In response to changes in the relevant attributes, logging/security agent 160 can take action including, for example, notification and/or access denial. In one embodiment, email (or other) notification provides a means of informing/alerting users who would be interested in this issue. The text can be dependent on if the notification directed to the user or "security admin" user and also depend on the security level. In one embodiment, if the request came from a mobile device no email notification occurs (unless high security is active).

In one embodiment, access denial can result from detected changes in the relevant attributes. In one embodiment, access denial is based on monitoring the initial machine ID and/or IP address and denying any new requests from the session that have different machine IDs or IP addresses. In one embodiment, the access is rejected as if the session was invalid.

Figure 2:
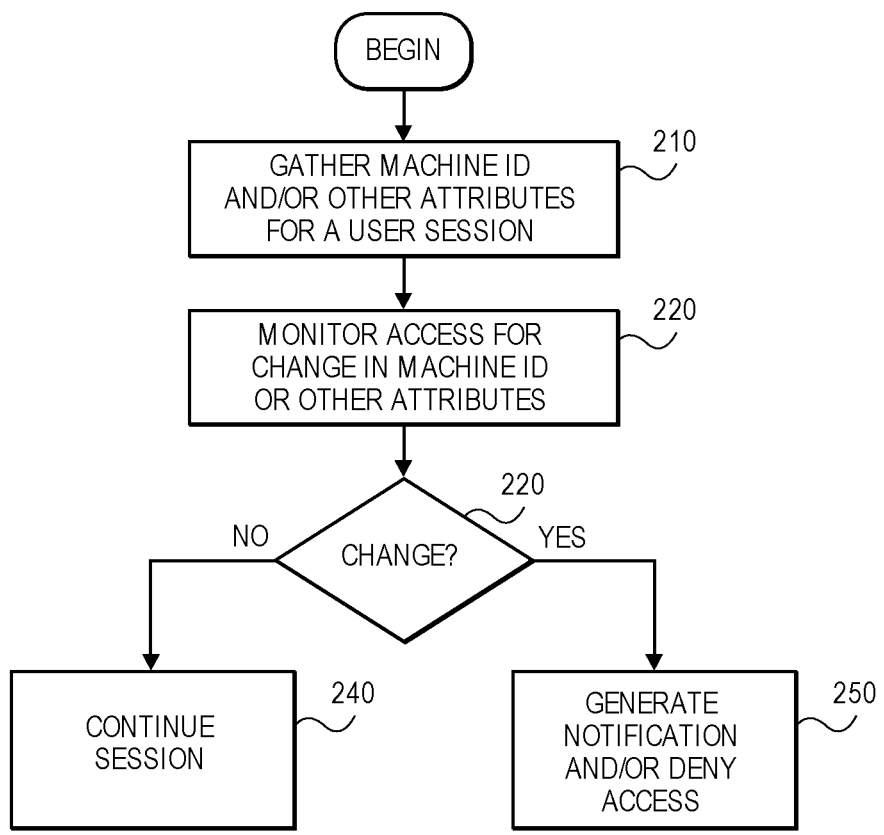
FIG. 2 is a flow diagram for one embodiment of a technique for secure session logging and management.

FIG. 2 is a flow diagram for one embodiment of a technique for secure session logging and management. In one embodiment, the technique of FIG. 2 is provided by a logging/security agent (e.g., 160 in FIG. 1). In alternate embodiments, the technique of FIG. 2 can be performed by other components within the computing environment.

In association with starting a session, device attributes to uniquely identify the electronic device used to start the session is captured, 210. In one embodiment, a user name (or email address) and password are used to authentication a user to start a session, which can have an associated cookie on the device used by the user. In one embodiment, this information is referred to as a machine identifier (ID), which can be any set of attributes that can be used to uniquely identify the electronic device used to start the session. The machine ID can be based on, for example, browser type and/or version, operating system type and/or version, IP address, user name, hardware address, and/or device serial number. Other and/or different attributes can also be used.

In one embodiment, this capturing is not performed for mobile devices. In alternate embodiments, the attributes monitored for mobile devices can be different than the attributes monitored for non-mobile devices.

In one embodiment, a session may be assigned a default security level. For example, all sessions can be set to low security unless changed by an administrator (or by the user). Default settings can also be managed on a per-tenant (in a multitenant system) or a per-server basis (e.g., some servers can be higher security than others). As another example, default settings can be managed on a per-pod or per-instance basis (e.g., some pods/instances can be higher security than others).

The session is monitored during subsequent accesses for changes to the machine ID (or any selected attributes), 220. In one embodiment, for each access to the secured environment (or one or more selected secure resources), the relevant attributes are monitored and logged. This logging can occur whether or not there is a change in any of the attributes.

During subsequent activity, if there is no change in the machine ID, 220, the session is allowed to continue, 240. However, if, during subsequent activity, there is a change to the machine ID, 220, a notification is generated and/or access is denied, 250. The notification type and/or recipient can be dependent on the security level of the session. For example, in one embodiment, a notification is sent to an authorized/verified email address for a low security session. This allows the authorized user to take action, if necessary.

For example, an email message having links corresponding to whether the user considers the activity authorized or not. The message can provide one or more of the attributes being monitored (e.g., location, IP address, operating system type) so that the user can determine whether the access in question is from his/her computer or from another device. The user can then take action (e.g., allow the access or terminate the session) based on that information.

In a higher security session (e.g., medium security) the information can be provided to one or more system administrators, who can allow or terminate the session. This can be used, for example, to terminate a session by an authorized user who is accessing the secure resource through an unknown/unsecured network.

In some embodiments, some or all access can be denied based on changes to the machine ID. For example, if an operating system change is detected and/or a location changes by more than a pre-selected amount in a pre-selected time, the session can be terminated. In some embodiments, subsequent sessions may require further verification in response to certain attribute changes. These few examples are intended to be general examples and not a limiting list of the attributes and/or responses that can be supported.

Figure 3:
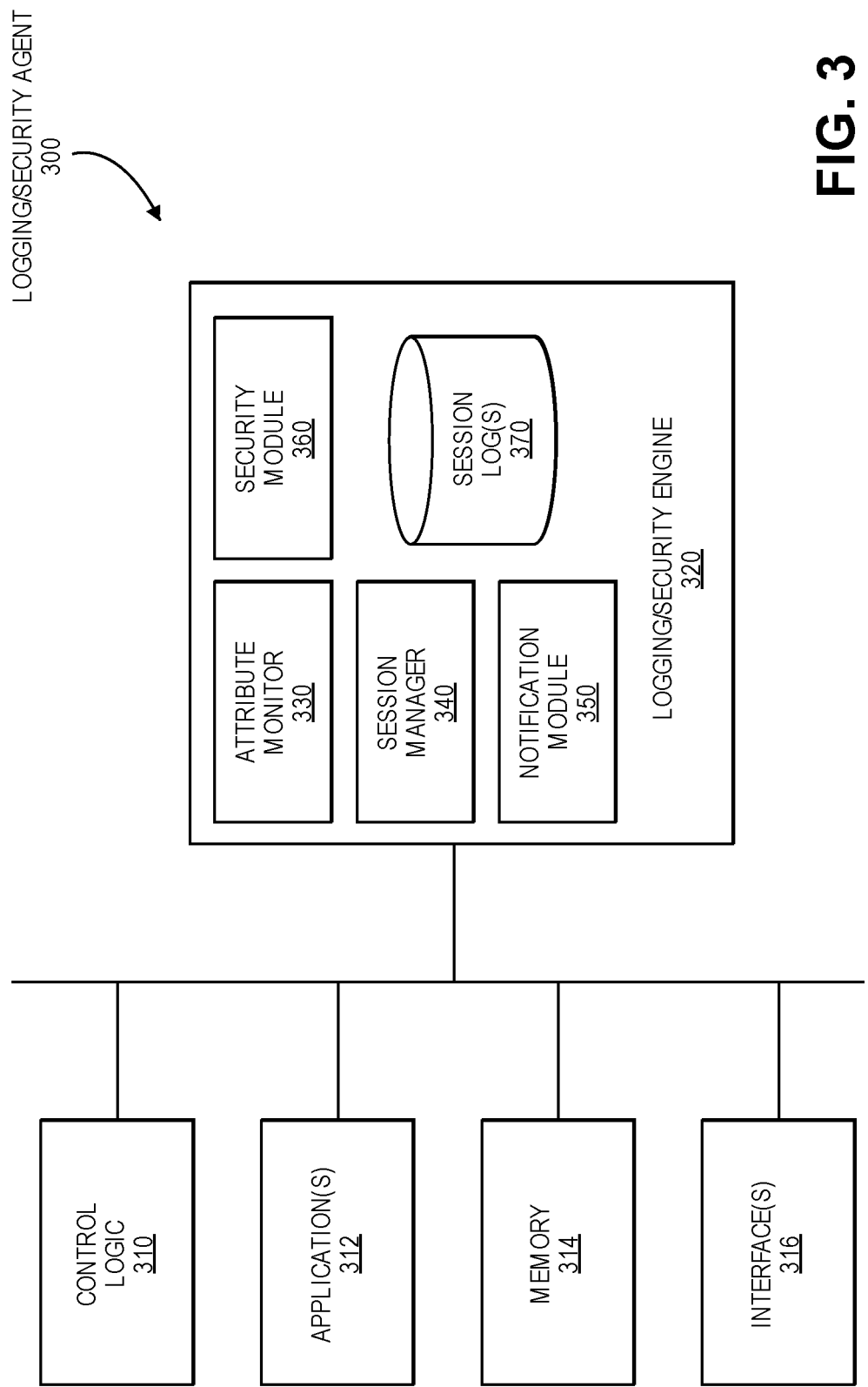
FIG. 3 is a block diagram of one embodiment of a logging/security agent to provide secure session logging and management.

FIG. 3 is a block diagram of one embodiment of a logging/security agent to provide secure session logging and management. In one embodiment, logging/security agent 300 includes control logic 310, which implements logical functional control to direct operation of logging/security agent 300, and/or hardware associated with directing operation of logging/security agent 300. Logic may be hardware logic circuits and/or software routines. In one embodiment, logging/security agent 300 can be part of an on-demand services environment, various example embodiments of which are described in greater detail below.

In one embodiment, logging/security agent 300 includes one or more applications 312, which represent code sequence and/or programs that provide instructions to control logic 310. Applications can provide various functional components of logging/security agent 300.

Logging/security agent 300 includes memory 314, which represents a memory device and/or access to a memory resource for storing data and/or instructions. Memory 314 may include memory local to logging/security agent 300, as well as, or alternatively, including memory of the host system on which logging/security agent 300 resides.

In one embodiment, logging/security agent 300 also includes one or more interfaces 316, which represent access interfaces to/from (an input/output interface) logging/security agent 300 with regard to entities (electronic or human) external to logging/security agent 300. Interface(s) 316 can include, for example, the various APIs utilized to perform the functionality described above and/or the user interface discussed above. Other and/or different and/or additional interfaces can also be provided.

Logging/security agent 300 also includes logging/security engine 320, which includes one or more functions or modules that enable logging/security agent 300 to provide the records management services as described above. The example of FIG. 6 provides several modules that may be included in logging/security engine 320; however, different and/or additional modules may also be included. Example modules that may be involved include attribute monitor 330, session manager 340, notification module 350, security module 360 and session log(s) 370. The modules of logging/security engine 320 can be hardware, software or a combination thereof.

Attribute monitor 330 functions to gather and/or monitor the selected attributes of the device used to access the secure environment/resource(s). In one embodiment, attribute monitor 330 gathers machine ID information before access is granted to the secure environment/resource(s) as part of a session. In other embodiments, the monitoring can be an ongoing operation during the session, for example, every five minutes, etc. As discussed above, different attributes can be monitored for different types of electronic devices.

Session manager 340 functions to manage sessions between one or more remote devices (e.g., desktop computer system, tablet, wearable device) and the secure environment. Session manager 340 may, for example, manage cookies or other data to be stored on the remote device so that a session can be continued for a period of time. Session manager 340 can communicate with attribute monitor 330 to provide session management operations as described herein.

Session log(s) 370 represent a memory or storage device that can be used to store session information, attribute information and/or other information that can be used to provide the session management operations as described herein. For example, attribute monitor 330 may store machine ID and/or other attribute information within session log(s) 370. Session manager may read, store and/or update session log information within session log(s) 370.

Notification module 350 can function to send notifications to one or more recipients in response to, for example, changes in machine ID during a session. Notification module 350 can cause one or more electronic mail messages to be sent, one or more text messages to be sent, one or more pop up windows to be triggered, etc. The recipients can include, for example, an authorized user, a user's manager, a group leader, a system administrator, etc.

Security module 360 functions to perform security actions in response to changes in machine ID. For example, depending on the security level and/or the type of change in machine ID, security module 360 can terminate a session. As another example, security module 360 can cause access to be partially restricted. In one embodiment, security module 360 can operate with notification module 350 to perform security operations. For example, security module 360 can terminate a session in response to input from a user that was prompted by an electronic mail message.

Figure 4:
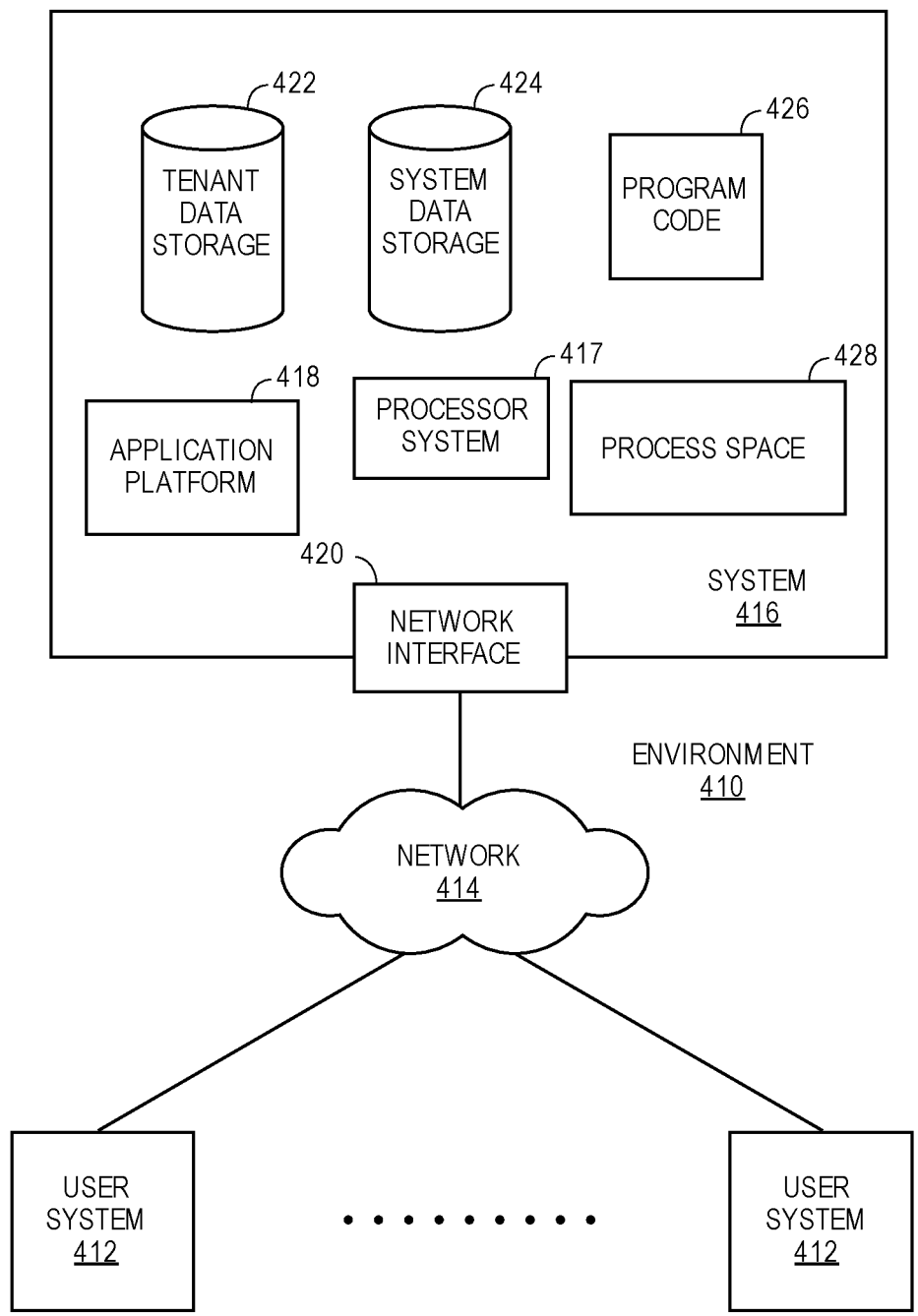
FIG. 4 is a block diagram of one embodiment of an on-demand services environment in which the secure session logging and management techniques can be utilized.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Core series processor or the like. Similarly, system 416 (and additional instances of an MTS, where more than one is present) and all of their components might be operator configurable using application(s) including computer code to run using a central processing unit such as processor system 417, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server"

are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
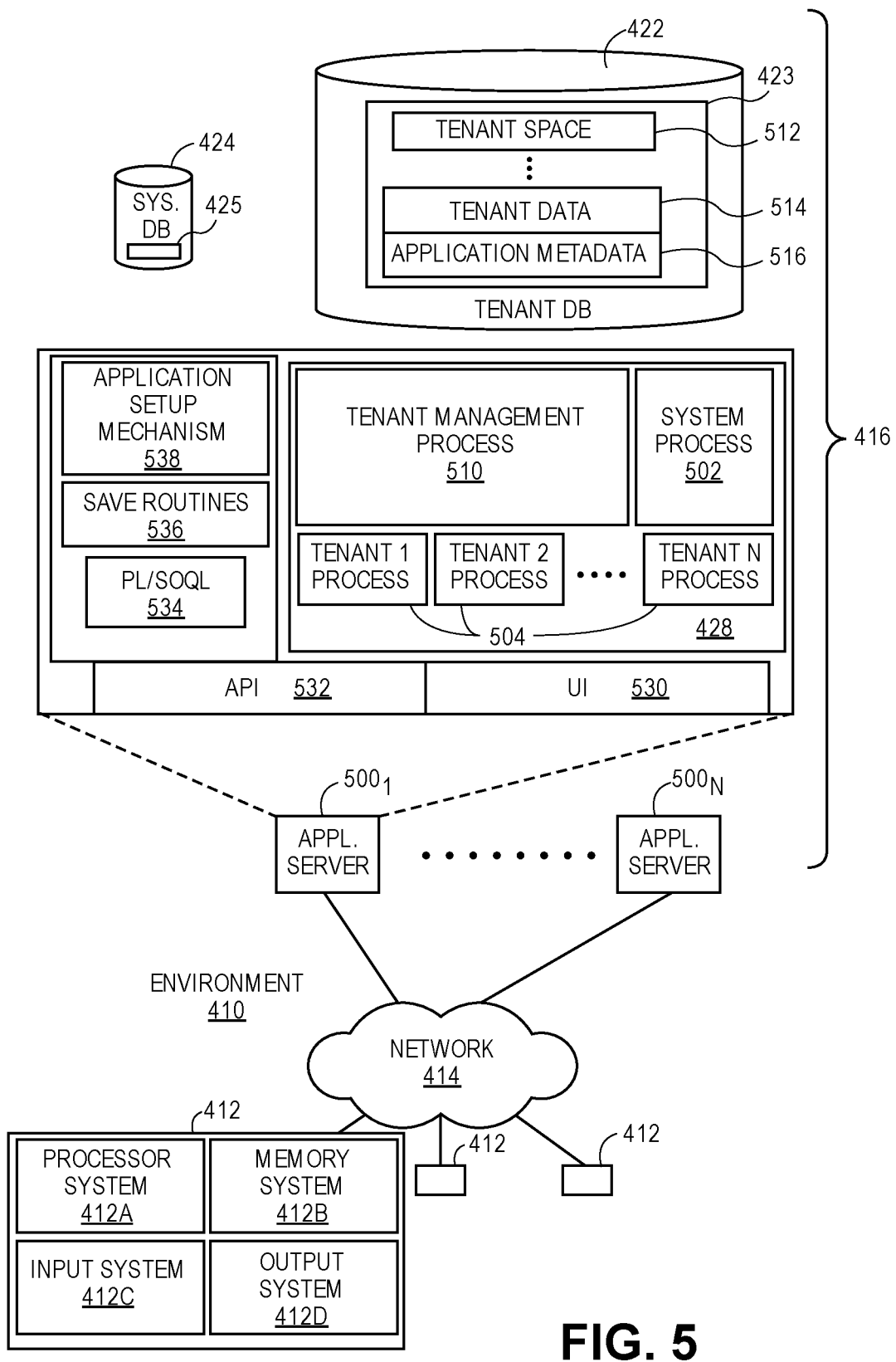
FIG. 5 is a block diagram of one embodiment of an on-demand services environment in which the secure session logging and management techniques can be utilized.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$400_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 BIG-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for providing security for a session corresponding to a user account during which a remote electronic device is allowed to access at least one secure resources through a network connection, the method comprising:

gathering a machine identifier (machine ID) that is a unique reference to an operating environment to uniquely reference a user based on multiple attributes of the operating environment of the electronic device used to access the resource during the session having a session identifier (session ID), wherein the machine ID uniquely identifies an operating environment of the remote electronic device to uniquely reference a user of the remote electronic device based on multiple operating attributes associated with the operating environment during the session, and wherein different attributes are utilized to determine a machine ID for a mobile device than for a non-mobile device;

maintaining a listing of the machine ID and subsequent machine IDs for non-mobile devices, if any, for a user throughout their login life;

monitoring subsequent access to the resource during the session and the corresponding user account to determine whether changes occur to the machine ID that indicate unauthorized access to the resource;

logging machine IDs for all accesses to the resource from the user account during the session;

taking a security action in response to a change in machine ID or in response to geographic movement beyond a predetermined threshold during the session based on a security level for the session ID.

2. The method of claim 1 wherein the electronic device is not a mobile electronic device.

3. The method of claim 1 wherein the device identification attributes comprises one or more of a browser type used to access the resource, an operating system type running on the electronic device, and an Internet Protocol (IP) address of the electronic device.

4. The method of claim 1, wherein if the electronic device is a mobile electronic device, requiring explicit authorization of a machine identifier for the mobile electronic device.

5. The method of claim 1 wherein the security action comprises denying access, at least partially, to the resource in response to a change in the device identification attributes.

6. The method of claim 1 wherein the security action comprises terminating the session.

7. The method of claim 1 wherein the security action comprises sending a notification to at least one of a system administrator and a user corresponding to the device identification attributes.

8. A non-transitory computer-readable medium having stored thereon instructions that, when executed by one or more processors, are configurable to cause the one or more processors to provide security for a session to access a secure networked resource, the one or more processors configurable to:

gather a machine identifier (machine ID) that is a unique reference to an operating environment to uniquely reference a user based on multiple attributes of the operating environment of the electronic device used to access the resource during the session having a session identifier (session ID), wherein the machine ID uniquely identifies an operating environment of the remote electronic device to uniquely reference a user of the remote electronic device based on multiple operating attributes associated with the operating environment during the session, and wherein different attributes are utilized to determine a machine ID for a mobile device than for a non-mobile device;

maintain a listing of the machine ID and subsequent machine IDs for non-mobile devices, if any, for a user throughout their login life;

monitor subsequent access to the resource during the session and the corresponding user account to determine whether changes occur to the machine ID that indicate unauthorized access to the resource;

log machine IDs for all accesses to the resource from the user account during the session;

take a security action in response to a change in machine ID or in response to geographic movement beyond a predetermined threshold during the session based on a security level for the session ID.

9. The non-transitory computer-readable medium of claim 8 wherein the electronic device is not a mobile electronic device.

10. The non-transitory computer-readable medium of claim 8 wherein the device identification attributes comprises one or more of a browser type used to access the resource, an operating system type running on the electronic device, and an Internet Protocol (IP) address of the electronic device.

11. The non-transitory computer-readable medium of claim 8, wherein if the electronic device is a mobile electronic device, requiring explicit authorization of a machine identifier for the mobile electronic device.

12. The non-transitory computer-readable medium of claim 8 wherein the security action comprises denying access, at least partially, to the resource in response to a change in the device identification attributes.

13. The non-transitory computer-readable medium of claim 8 wherein the security action comprises terminating the session.

14. The non-transitory computer-readable medium of claim 8 wherein the security action comprises sending a notification to at least one of a system administrator and a user corresponding to the device identification attributes.

15. A system comprising:

a physical memory device;

one or more hardware processing devices coupled with the physical memory device, the one or more hardware processing devices to gather a machine identifier (machine ID) that is a unique reference to an operating environment to uniquely reference a user based on multiple attributes of the operating environment of the electronic device used to access the resource during the session having a session identifier (session ID), wherein the machine ID uniquely identifies an operating environment of the remote electronic device to uniquely reference a user of the remote electronic device based on multiple operating attributes associated with the operating environment during the session, and wherein different attributes are utilized to determine a machine ID for a mobile device than for a non-mobile device, to maintain a listing of the machine ID and subsequent machine IDs for non-mobile devices, if any, for a user throughout their login life, to monitor subsequent access to the resource during the session and the corresponding user account to determine whether changes occur to the machine ID that indicate unauthorized access to the resource, to log machine IDs for all accesses to the resource from the user account during the session, and to take a security action in response to a change in machine ID or in response to geographic movement beyond a predetermined threshold during the session based on a security level for the session ID.

16. The system of claim 15 wherein the electronic device is not a mobile electronic device.

17. The system of claim 15 wherein the device identification attributes comprises one or more of a browser type used to access the resource, an operating system type running on the electronic device, and an Internet Protocol (IP) address of the electronic device.

18. The system of claim 15, wherein if the electronic device is a mobile electronic device, requiring explicit authorization of a machine identifier for the mobile electronic device.

19. The system of claim 15 wherein the security action comprises denying access, at least partially, to the resource in response to a change in the device identification attributes.

20. The system of claim 15 wherein the security action comprises terminating the session.

21. The system of claim 15 wherein the security action comprises sending a notification to at least one of a system administrator and a user corresponding to the device identification attributes.

* * * * *